Figure 1:
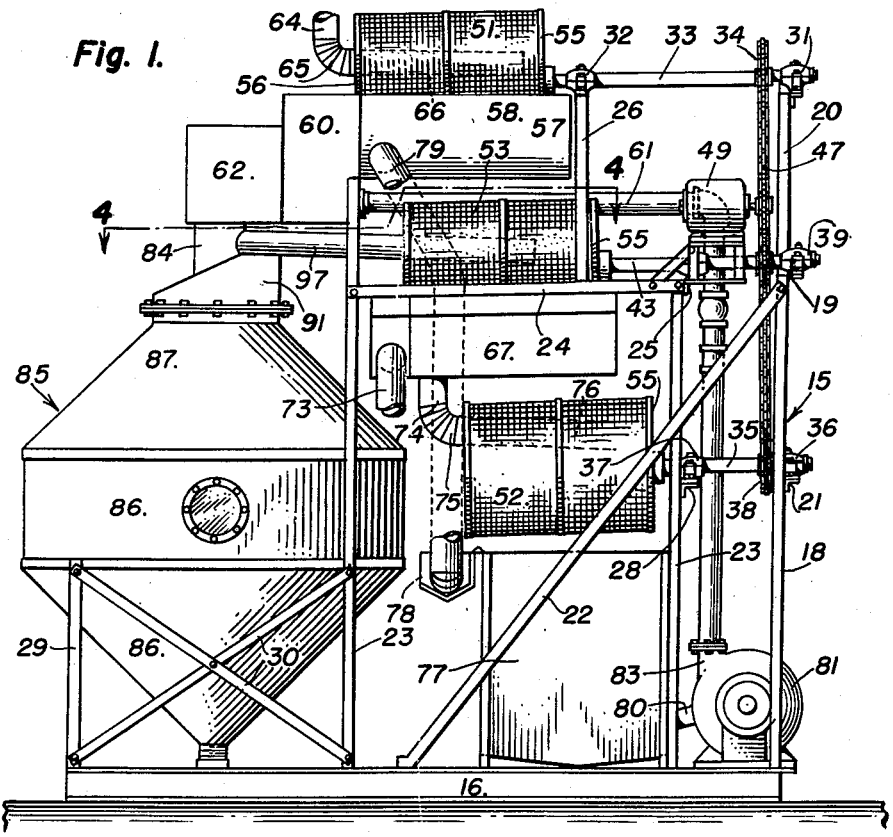

May 20, 1952     C. L. KEY     2,597,108
GRADING APPARATUS
Filed Nov. 20, 1946     4 Sheets-Sheet 1

Inventor
Claude L. Key
By Clarence A. O'Brien
and Harvey B. Jackson
Attorneys

May 20, 1952 — C. L. KEY — 2,597,108
GRADING APPARATUS
Filed Nov. 20, 1946 — 4 Sheets-Sheet 2
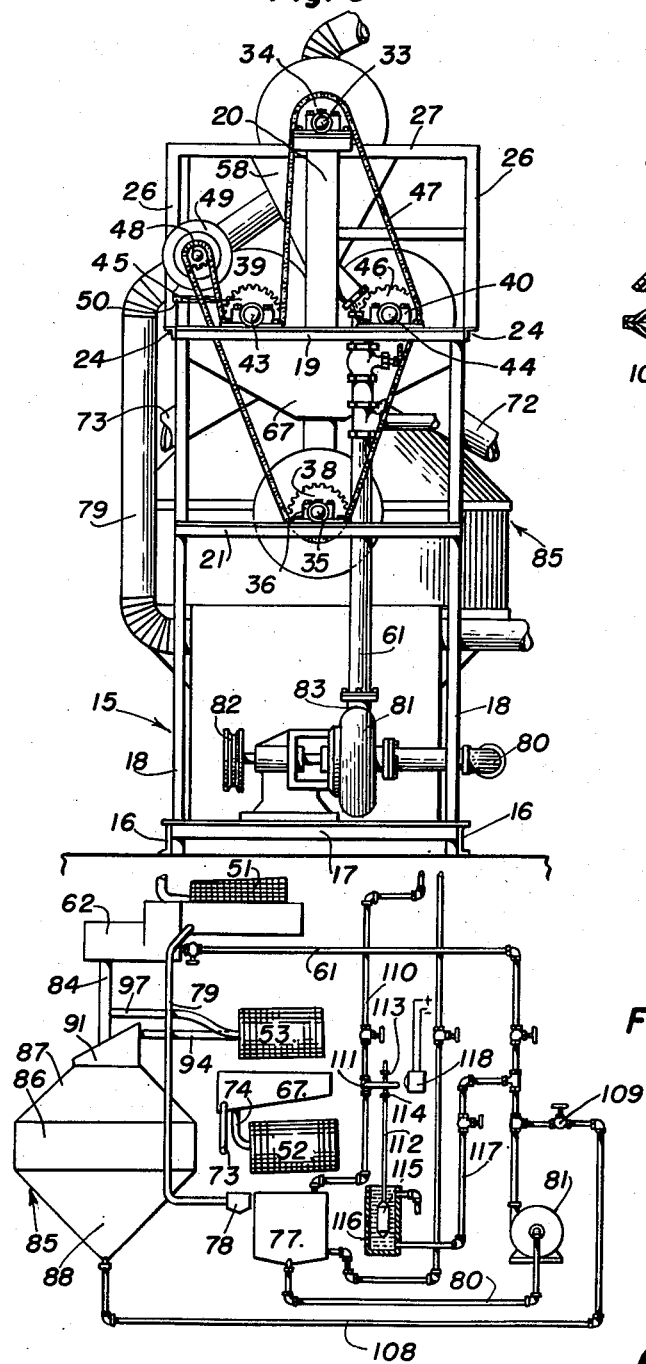
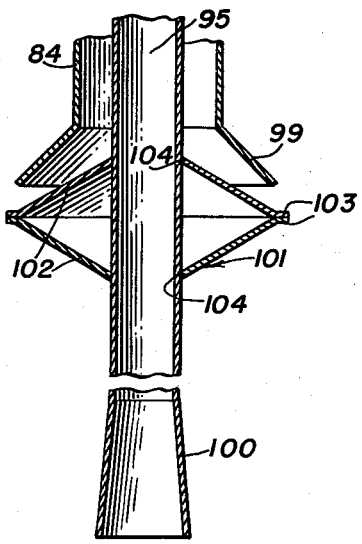
Inventor
Claude L. Key

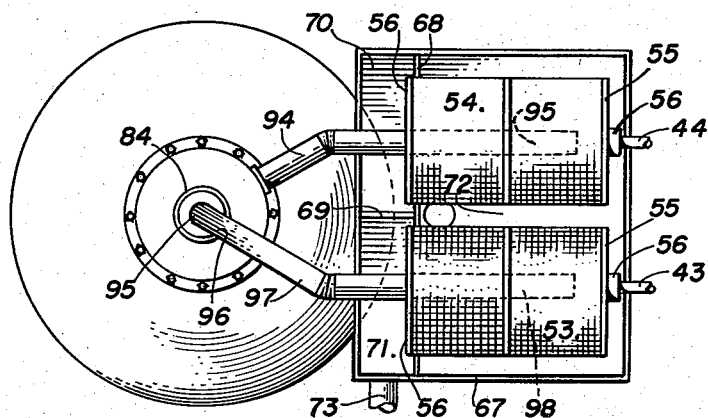
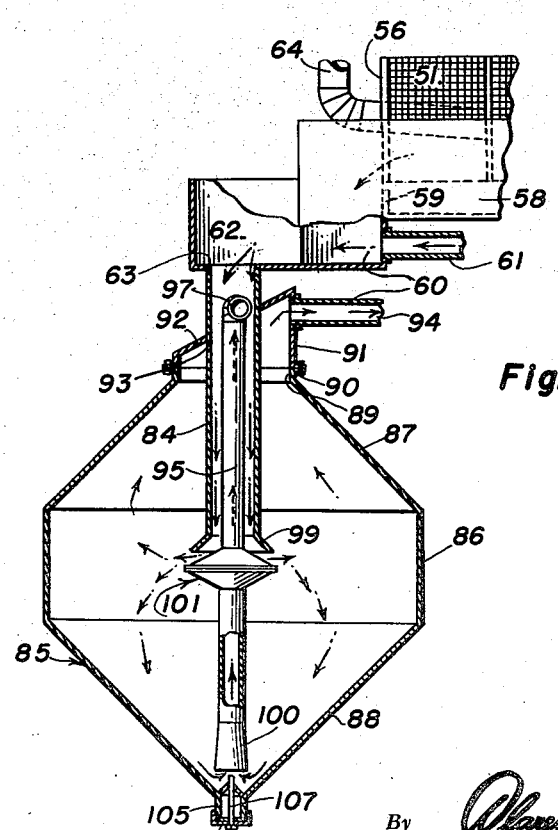

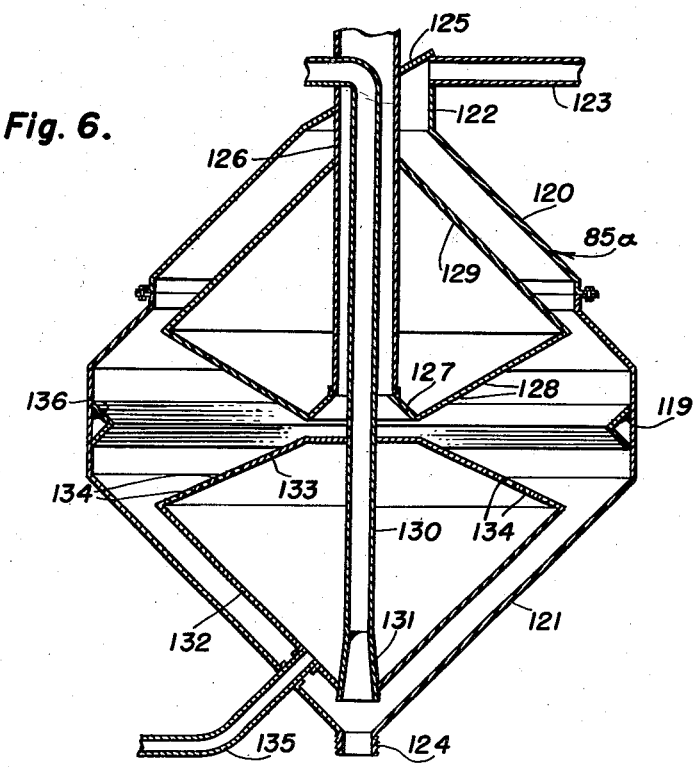
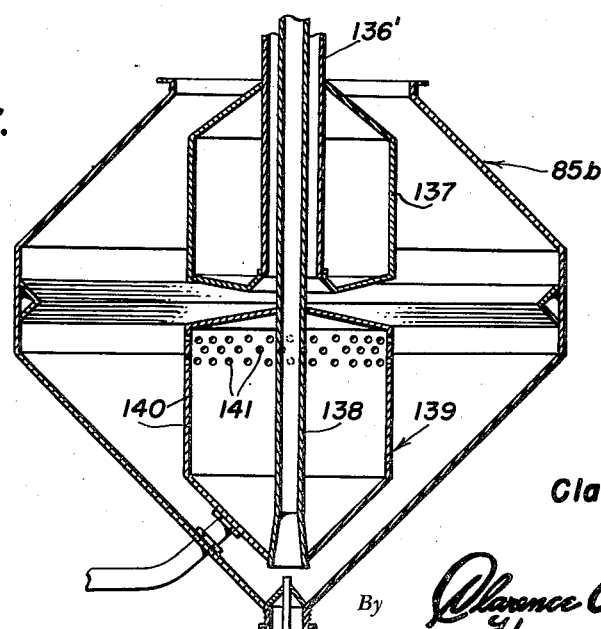

Patented May 20, 1952

2,597,108

UNITED STATES PATENT OFFICE 2,597,108

GRADING APPARATUS

Claude L. Key, Milton, Oreg.

Application November 20, 1946, Serial No. 710,973

3 Claims. (Cl. 209—173)

This invention relates to a method and apparatus for grading food products such as peas, beans, and the like and is an improvement over my copending application, Serial No. 622,505, filed October 16, 1945, patented May 29, 1951, No. 2,254,495.

The primary object of the invention is to separate peas, beans, and like products according to their specific gravities.

Another object is to separate from such products waste material which is generally of a lighter nature than the products to be used.

The above and other objects may be attained by employing this invention which embodies, among its features, introducing into a liquid bath having a predetermined specific gravity a stream of the bath liquid containing the solids to be separated, extracting the lighter solids together with bath liquid from the top of the liquid bath, extracting the heavier solids together with bath liquid from the bottom of the liquid bath and separating the solids from the bath liquid with which they were extracted.

Other features include recovering the bath liquid so extracted from the liquid bath and re-using it in the process.

Other features include a settling tank adapted to remain completely filled with a bath liquid having a predetermined composition and specific gravity, a conical bottom closing the lower end of the tank, a conical cap closing the upper end of the tank, an axially disposed feed tube entering the tank through the cap and terminating substantially midway between the upper and lower ends of the tank, a discharge tube for the lighter solids adjacent the apex of the top of the tank, a discharge tube for the heavier solids extending axially through the feed tube and terminating near the apex of the bottom of the tank, means connected to the feed tube and to the discharge tubes to maintain a circulation of bath liquid through the tank and means to introduce solids to be separated into the tank through the feed tube.

Other features include means to separate the solids from the fluids passing through the respective discharge tubes and means within the tank to reduce its volumetric capacity without interfering with the proper separation of the solids.

Figure 2:
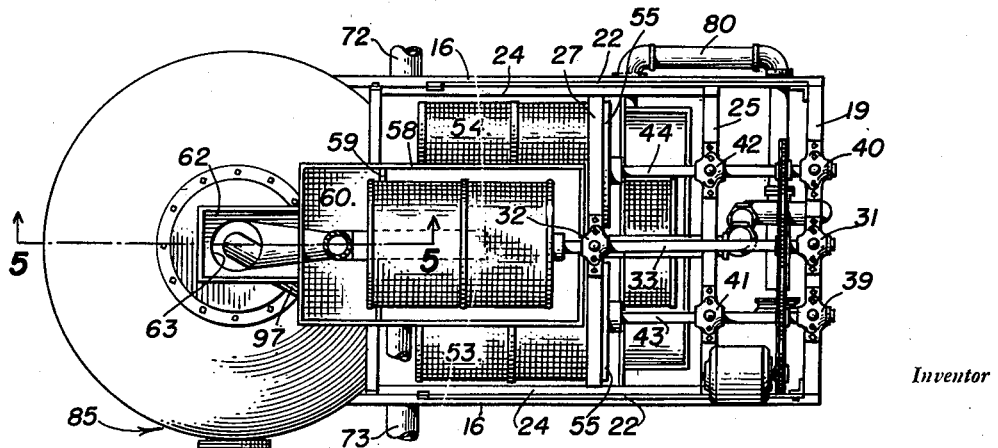

In the drawings:

Figure 1 is a side view of a separating system embodying the features of this invention, Figure 2 is a top plan view of Figure 1, Figure 3 is an end view of Figure 1, Figure 4 is a horizontal sectional view taken substantially along the line 4—4 of Figure 1, Figure 5 is a sectional view taken substantially along the line 5—5 of Figure 2, Figure 6 is an enlarged sectional view through a settling tank illustrating a modified form of deflector, Figure 7 is a view similar to Figure 6 illustrating a further modification of the deflector, Figure 8 is an enlarged fragmentary sectional view through the deflector illustrated in Figure 5, and Figure 9 is a schematic view illustrating the flow circuits of the system.

Referring to the drawings in detail, the frame and drive mechanism of my improved separator is designated generally 15 and comprises a pair of spaced parallel channel members 16 tied together by cross bars 17 at opposite ends to form a base. Rising from the ends of the channel members 16 at one end of the base are standards 18 which are tied together at their upper ends by a cross bar 19, intermediate the ends of which is supported an upwardly extending column 20, the purpose of which will more fully hereinafter appear. Extending transversely intermediate the upper and lower ends of the standards 18 is a cross bar 21, and extending downwardly and forwardly along each side of the main frame from the upper ends of the standards 18 to a point substantially midway between opposite ends of the channels 16 are diagonal brace bars 22.

Rising from the channels 16, intermediate their ends and in spaced relation to the standards 18, are standards 23 connected at their upper ends by side bars 24 and a cross bar 25 which lies in a plane slightly below the horizontal plane of the cross bar 19. Extending upwardly from the side bars 24 intermediate their ends are standards or columns 26, the upper ends of which are joined by a horizontally disposed cross bar 27 which lies in a plane slightly below the upper end of the column 20. Extending transversely between the pair of standards 23 adjacent the standards 18 at a point somewhat below the cross bar 25 is a cross bar 28 which lies in a horizontal plane near, but slightly below the horizontal plane of the cross bar 21. Extending upwardly from the ends of the channels 16 opposite those carrying the standards 18 are legs 29 which are connected to the standards 23 remote from the standards 18 by cross braces 30.

Mounted for rotation in bearings 31 and 32, respectively carried by the column 20 and the cross bar 27, is a drive shaft 33 carrying, at the end adjacent the column 20, a drive sprocket 34. A similar drive shaft 35 is mounted to rotate in bearings 36 and 37 carried by the cross bars 21 and 28, respectively, and this drive shaft carries a drive sprocket 38. As illustrated in the drawings, the drive shaft 35 is located directly below the drive shaft 33, and both shafts are inclined downwardly in parallel relation toward the ends opposite those carrying the drive sprockets.

Mounted in horizontally spaced relation on the cross bar 19 are bearing journals 39 and 40, respectively, which align axially with bearing journals 41 and 42 carried by the cross bar 25 previously referred to. A drive shaft 43 is mounted to rotate in the journals 39 and 41, and a similar drive shaft 44 is mounted to rotate in the journals 40 and 42. Like the drive shafts 33 and 35, the drive shafts 43 and 44 tilt downwardly toward their ends opposite the journals 39 and 40 in spaced parallel relation. A drive sprocket 45 is attached to the shaft 43 near the end adjacent the journal 39, and a similar drive sprocket 46 is fixed to the shaft 44 near the end adjacent the journal 40. Trained over the drive sprockets 34, 38, 45, and 46 is a drive chain 47 which has driving connection with a drive sprocket 48 carried by the drive shaft of a prime mover 49, such as an electric motor, which is mounted on a platform 50 carried by the frame 15 near the journal bearing 39. It will thus be seen that when the prime mover 49 is set into motion, the shafts 33, 35, 43 and 44 will be rotated in unison.

Carried by the ends of the drive shafts 33, 35, 43 and 44 are foraminous drums 51, 52, 53 and 54, respectively. Each of these drums comprises a circular cylindrical side wall formed of foraminous material, an end closure 55 and an open end 56. The end closure of each drum 55 is provided with a collar 57 for connection to its respective drive shaft, and the drums tilt downwardly in axial alignment with the axes of their respective shafts from their closed ends.

Mounted in the frame 15 directly below the drum 51 is a substantially V-shaped trough 58 having a transversely extending partition wall 59 over which the open end 56 of the drum 51 extends, so that material deposited in the drum which fails to pass through the foraminous wall thereof will be discharged through the open end 56 into a compartment 60 separated from the trough 58 by the partition wall 59. As illustrated in Figure 1, the compartment 60 extends below the level of the bottom of the trough 58 and has connected thereto a feed pipe 61 for the flotation solution, as will be more fully hereinafter described. Extending from the end of the compartment 60 opposite that into which the pipe 61 opens is a feed hopper 62 provided with a bottom discharge opening 63 (Fig. 2). A flow pipe 64 leads from a suitable source of supply to create a flow of water containing the solids to be separated and has its discharge end connected through the medium of an elbow 65 to a discharge nipple 66 located within the drum 51, with the discharge end thereof terminating in spaced relation to the rear wall 55 thereof. It will thus be seen that solids introduced into the drum 51 with a stream of water entering through the pipe 64 will be separated by the foraminous wall 58 of the drum from the liquid, with the latter falling into the trough 58, while the solids are discharged from the open end 56 of the drum 51 into the trough 60.

Supported on the side bars 24 and extending beneath both drums 53 and 54 is a V-shaped trough 67 which, like the trough 58, is provided near one end with a partition wall 68 (Fig. 4). A longitudinally extending partition wall 69 separates the end of the trough 67 divided from the main portion of the trough by the partition wall 68 into two separate compartments 70 and 71, into which the solids discharged by the drums 54 and 67 are respectively received. A drain opening 72 is formed in the bottom of the trough 67 near the partition wall 68, and leading from the compartments 70 and 71, respectively, are discharge spouts 72 and 73, respectively (Fig. 3).

A liquid discharge pipe 74 is connected to the discharge opening 72 and is provided, at its lower end, with an elbow 75, to which a discharge nipple 76 is coupled. This discharge nipple enters the drum 52 and terminates near the rear wall 55 thereof, as will be readily understood upon reference to Figure 1.

Supported in the frame 15 directly below the drum 52 is a recovery receptacle or catch basin 77 and extending along the end of the catch basin adjacent the open end 56 of the drum 76 is a waste trough 78, into which the open end of the drum 76 discharges. A drain pipe 79 leads from the trough 58, and its discharge end opens into the waste trough 78 so that the water separated from the solids introduced through the pipe 64 may be utilized to flush away waste received in the waste trough 78.

Leading from the bottom of the recovery tank 77 is a pipe 80 which, in turn, is connected to the intake end of a fluid pump 81, to the drive shaft of which is connected a drive pulley 82 through which power may be transmitted to the pump from any suitable source. The discharge end 83 of the pump 81 is connected to the pipe 61 at the end opposite that entering the compartment 60 of the trough 58, so that fluid may be extracted from the recovery tank and discharged into the compartment 60 and feed hopper 62 in a continuous stream.

Communicating with the opening 63 in the bottom of the feed trough 62 is the inlet tube 84 of a settling tank designated generally 85. This tank comprises a circular, cylindrical body 86, opposite ends of which are provided with substantially conical heads 87 and 88, respectively. The upper convergent end of the head 87 is provided with an upwardly extending, flanged collar 89, to which is connected, as by bolts 90, a cap 91, the main body portion of which is cylindrical in form, and the upper end of the cap is closed by an inclined end wall or cover 92 formed with an axial opening 93 through which the inlet pipe 84 enters the settling tank. Leading from the side wall of the cap 91 adjacent its highest point is a discharge tube 94 which projects laterally and is provided with a discharge nipple 95, the discharge end of which terminates near the wall 55 of the drum 54.

Extending axially through the inlet pipe 84 to a point near the extreme lower convergent end of the conical bottom 88 is a discharge pipe 95, the upper end of which passes through a radial opening 96 (Fig. 4) in the wall of the intake pipe 84 above the cover 92, and attached to the radial extension 97 of the pipe 95 is a nipple 98, the discharge end of which enters the drum 53 and terminates near the wall 55 thereof. The lower end of the intake pipe 84 terminates substantially midway between opposite ends of the settling tank 85 and is provided with a flared portion 99, while the lower end of the discharge pipe 95 is slightly flared, as at 100. Fitted on the discharge pipe 95, immediately below the flared portion 99 of the intake pipe 84, is a deflector, designated generally 101, which comprises a pair of substantially conical members 102 having, at their bases, flanges 103 which are soldered or otherwise joined to effect a fluid-tight joint. As shown, the substantially conical members 102 are each provided with axial openings 104 for the reception of the discharge pipe 95 to which the conical members are soldered or otherwise secured to form a fluid-tight junction with the pipe at these points. Extending axially from the extreme lower end of the bottom 88 is an externally screw-threaded nipple 105, upon which is threaded a cap 106 carrying an axially disposed nipple 107, the discharge end of which is located adjacent the extreme lower end of the flared portion 100 of the pipe 95. This nipple 107 is disposed axially with relation to the pipe 95, and connected thereto is a feed pipe 108 which is connected through the medium of a valve 109 (Fig. 9) to the pipe 61 leading from the pump 81. It will thus be seen that by manipulating the valve 109, a flow of fluid from the pump 81 may be established upwardly through the nipple 107 and into the discharge pipe 95, as suggested by the dotted lines in Figure 5.

In use, it will be understood that the solids to be separated are mixed with a liquid such as water and pumped thru the pipe 64 into the drum 51, the fluid serving as the conveying means for the solids. Upon being discharged from the nipple 66 into the drum 51, the water will be discharged through the foraminous wall of the drum into the trough 58, while the solids are discharged through the open end 56 of the drum 51 into the trough 60. The pump 81 containing a floatation liquid, such as brine, or a soapy substance, is then pumped by means of the pump 81 from the recovery tank 77 through the pipe 61 and into the bottom of the compartment 60 where it encounters the solids and carries them along into the feed trough 62 from whence they are discharged through the opening 63 into the feed pipe 84 of the settling tank 85. The floatation liquid fills the complete system so that the settling tank is also completely filled. The deposit of the inflowing liquid and the solids into the settling tank takes place well below the level of the liquid contained therein, and, in fact, in the largest body of liquid, so that the lighter particles of solids may float to the top of the tank 85 while the heavier solids sink to the bottom thereof. Due to the constant flow of liquid into the tank, and its constant discharge through the pipes 94 and 95, it will be obvious that the solids floating to the top of the tank will be discharged through the pipe 94, while those sinking to the bottom of the tank will be discharged through the pipe 95. The flow of the liquid and the solids through their repective discharge pipes causes the solids to be conducted through the nipples 95 and 96, respectively, to be discharged into the drums 53 and 54, where the solids are again separated from the liquid, with the lighter solids being discharged through the open end 56 of the drum 54 into the discharge trough 70, while the heavier solids are discharged from the discharge end 56 of the drum 53 into the discharge trough 71. The solids thus discharged are directed, through their respective spouts 72 and 73, into suitable receptacles. In the meantime, the floatation liquid received in the trough 67 is discharged through the pipe 74 and nipple 76 into the lowermost drum 52 which serves as a filter to permit the liquid to be discharged into the recovery tank 77, while any solid matter or waste is discharged through the open end 56 of the drum 76 into the waste trough 78. The water flowing through the pipe 79 from the trough 58 and discharging into the waste trough 78 will serve to flush any waste from the trough, which may be disposed of in any suitable manner, as by directing it to the sewer.

In order to maintain a proper concentration of floatation fluid in the system, I employ a feed pipe 110 (Fig. 9) leading from a suitable source of concentrated fluid and arranged to discharge it into the recovery tank 77. In order automatically to control the concentration of the floatation liquid, I provide a lever-operated valve 111 (Fig. 9) actuated by a rod 112 carrying adjustable stops 113 and 114. The lower end of the rod 112 is provided with a float 115 immersed in a tank 116, into which the floatation liquid from the system is introduced thru the medium of a pipe 117 connected with the pipe 61 leading from the pump 81 to the trough 60. The float 115 is so constructed as accurately to measure the specific gravity of the fluid so that as the concentration of floatation substances therein becomes diminished, the float will rise to open the valve 111 and admit the concentrate to the recovery tank 77, and when the proper concentration has been attained, the float will fall to close the valve 111 and discontinue the further flow of concentrated fluid into the system. I also may find it advantageous to employ a photoelectric cell 118 to govern the opening and closing of the valve 111.

In the modifications illustrated in Figures 6 and 7, I have illustrated settling tanks designated, respectively, 85a and 85b, either one of which may be employed in lieu of the settling tank 85 previously described. The tank 85a comprises a circular, cylindrical body 119 provided with a conical cap 120 and a conical bottom 121. The conical cap 120 terminates in a cap 122 corresponding, for all practical purposes, to the cap 91 previously described. This cap 122 is provided with a laterally extending discharge pipe 123, and the bottom 121 is provided with an externally threaded nipple 124 corresponding, in all respects, to the nipple 105 previously referred to. Leading into the settling tank 85a through the top 125 of the cap 122 is an inlet pipe 126 which terminates at a point substantially midway between the upper and lower ends of the tank 85a and is provided at its inner terminal with a flared portion 127, to the outer peripheral edge of which is connected an inverted frusto-conical member 128 terminating, at its outer peripheral edge, in a frusto-conical portion 129 which slopes upwardly and joins the pipe 126 near the upper end of the cap 120. The structure just referred to forms a filler which reduces the volumetric contents of the settling tank so as to effect economies in the use of the system, and at the same time establish a more rapid upward flow of the liquid between the walls 129 and 120.

Extending axially through the intake pipe 126 is an axial discharge pipe 130 carrying, at its lower end, a flared portion 131 which terminates near the collar 124, and carried by the pipe 130 is a conical deflector 132, to the upper end of which is attached a conical wall 133 having annular rows of perforations 134. A suitable fluid inlet pipe 135 passes through the conical bottom 121 and discharges into the conical deflector 132 so that fluid passing through the pipe 135 will be discharged into the settling tank 85a near the area of its greatest capacity. An inwardly extending, V-shaped deflector 136 is supported on the inner face of the cylindrical body 119 and cooperates with the deflectors 129 and 132 in separating the lighter from the heavier solids. It will be understood that the pipe 135 is connected with the fluid feed pipe 61 in order to produce an auxiliary flow of floatation fluid into the settling tank.

The settling tank 85b corresponds in practically all respects to the settling tank 85a excepting that the inlet pipe 136' is equipped with a deflector 137 of somewhat lesser size than the deflector defined by the walls 128 and 129, and the discharge pipe 138 is also equipped with a deflector 139 having a cylindrical side wall 140 containing rows of perforations 141 through which the floatation liquid is admitted into the interior of the tank in the manner previously described.

Obviously, the settling tanks 85a or 85b may be substituted in the system for the settling tank 85 without in any way altering the operation of the system except by the connection of the pipe 15 to the pipe 61.

While in the foregoing there has been shown and described the preferred embodiment of this invention, it is to be understood that minor changes in the details of construction and combination and arrangement of parts may be resorted to without departing from the spirit and scope of the invention as claimed.

What I claim is:

1. An apparatus for separating solids according to their specific gravities, said apparatus comprising a cylindrical tank having upper and lower conical end portions, a feed tube extending downwardly through the upper conical end portion and including a lower outwardly and downwardly flared end terminating medially of the end portions of the tank, a cap carried by the upper conical end portion and embracing said feed tube, a first discharge tube extending laterally from said cap, an inclined cover for the cap sloping upwardly toward the first discharge tube to constitute a baffle, a second discharge tube extending axially through the feed tube and including a radial extension at its upper end extending laterally through the feed tube, the lower end of said second discharge tube terminating adjacent and above the apex of said lower conical end portion, a deflector supported on said second discharge tube directly beneath the flared end of said feed tube, and an endless V-shaped deflector supported on the inner periphery of said tank and having its apex disposed in a horizontal plane between the flared end of said feed tube and the upper extremity of said first named deflector.

2. An apparatus for separating solids according to their specific gravities, said apparatus comprising a cylindrical tank having upper and lower conical end portions, a feed tube extending downwardly through the upper conical end portion and including a lower outwardly and downwardly flared end terminating medially of the end portions of the tank, a cap carried by the upper conical end portion and embracing said feed tube, a first discharge tube extending laterally from said cap, an inclined cover for the cap sloping upwardly toward the first discharge tube to constitute a baffle, a second discharge tube extending axially through the feed tube and including a radial extension at its upper end extending laterally through the feed tube, the lower end of said second discharge tube terminating adjacent and above the apex of said lower conical end portion, a deflector supported on said second discharge tube directly beneath the flared end of said feed tube, and an inverted frusto-conical member surrounding the feed tube and attached at its minor end to the flared end of said feed tube, a frusto-conical portion surrounding the feed tube above said frusto-conical member and having its major end attached to the major end of said frusto-conical member, said conical portion sloping upwardly and joining the feed tube adjacent said cap.

3. An apparatus for separating solids according to their specific gravities, said apparatus comprising a cylindrical tank having upper and lower conical end portions, a feed tube extending downwardly through the upper conical end portion and including a lower outwardly and downwardly flared end terminating medially of the end portions of the tank, a cap carried by the upper conical end portion and embracing said feed tube, a first discharge tube extending laterally from said cap, an inclined cover for the cap sloping upwardly toward the first discharge tube to constitute a baffle, a second discharge tube extending axially through the feed tube and including a radial extension at its upper end extending laterally through the feed tube, the lower end of said second discharge tube terminating adjacent and above the apex of said lower conical end portion, a deflector supported on said second discharge tube directly beneath the flared end of said feed tube, and an inverted frusto-conical member surrounding the feed tube and attached at its minor end to the flared end of said feed tube, a frusto-conical portion surrounding the feed tube above said frusto-conical member and having its major end attached to the major end of said frusto-conical member, said conical portion sloping upwardly and joining the feed tube adjacent said cap, and an endless V-shaped deflector supported on the inner periphery of said tank and having its apex disposed in a horizontal plane between the flared end of said feed tube and the upper extremity of said first named deflector.

CLAUDE L. KEY.

REFERENCES CITED

The following references are of record in the file of this patent:

UNITED STATES PATENTS

| Number | Name | Date |
|---|---|---|
| Re. 22,191 | Wade | Sept. 29, 1942 |
| 500,662 | Lockhart | July 4, 1893 |
| 1,169,292 | Smith | Jan. 25, 1916 |
| 1,456,165 | Whitney | May 22, 1923 |
| 1,721,423 | Warren | July 16, 1929 |
| 1,780,830 | Lessing | Nov. 4, 1930 |
| 1,911,013 | Chapman | May 23, 1933 |
| 1,963,671 | Olney | June 19, 1934 |
| 2,320,335 | Bauer | June 1, 1943 |
| 2,356,648 | Brusset | Aug. 22, 1944 |
| 2,357,566 | Walter | Sept. 5, 1944 |
| 2,373,635 | Wuensch | Apr. 10, 1945 |
| 2,379,184 | Rakowsky | June 26, 1945 |
| 2,437,671 | Anderson | Mar. 16, 1948 |

FOREIGN PATENTS

| Number | Country | Date |
|---|---|---|
| 25,936 | Great Britain | of 1912 |